A. D. STEVENS.
FILTER FOR CANE SIRUP.
APPLICATION FILED SEPT. 22, 1920.

1,404,667. Patented Jan. 24, 1922.

Witnesses

Inventor
Arthur D. Stevens,
By
Attorney

UNITED STATES PATENT OFFICE.

ARTHUR D. STEVENS, OF JACKSONVILLE, FLORIDA, ASSIGNOR OF ONE-HALF TO NAULBERT A. GILBERT, OF JACKSONVILLE, FLORIDA.

FILTER FOR CANE SIRUP.

1,404,667.  Specification of Letters Patent.  Patented Jan. 24, 1922.

Application filed September 22, 1920. Serial No. 412,014.

*To all whom it may concern:*

Be it known that I, ARTHUR D. STEVENS, a citizen of the United States, residing at Jacksonville, in the county of Duval and State of Florida, have invented new and useful Improvements in Filters for Cane Sirup, of which the following is a specification.

This invention relates to an improved bag filter for use in the manufacture of cane sirup and adapted to be included in general apparatus or with other mechanical instrumentalities utilized in the manufacture of cane sirup. The main object of the improvement is to provide a filter having a simplified organization of parts arranged in separable relation and including a filter basket and an upper receptacle or pot in which the basket is removably disposed, the basket permitting the introduction of bleaching material or other reagents without additional apparatus. A further object of the invention is to provide a filtering receptacle or pot at the upper part of the improved filter of such depth as to give it sufficient capacity to allow a full batch or discharge of liquid to be emptied without reference to the rate of filtering. A still further object of the invention is to provide an improved filter of the class specified wherein the filtering receptacle or pot and bag can be conveniently examined and changed by mounting them for removal from the main filtering receptacle.

With these and other objects and advantages in view, the invention consists in the construction and arrangement of the several parts which will be more fully hereinafter described and claimed.

Figure 1:
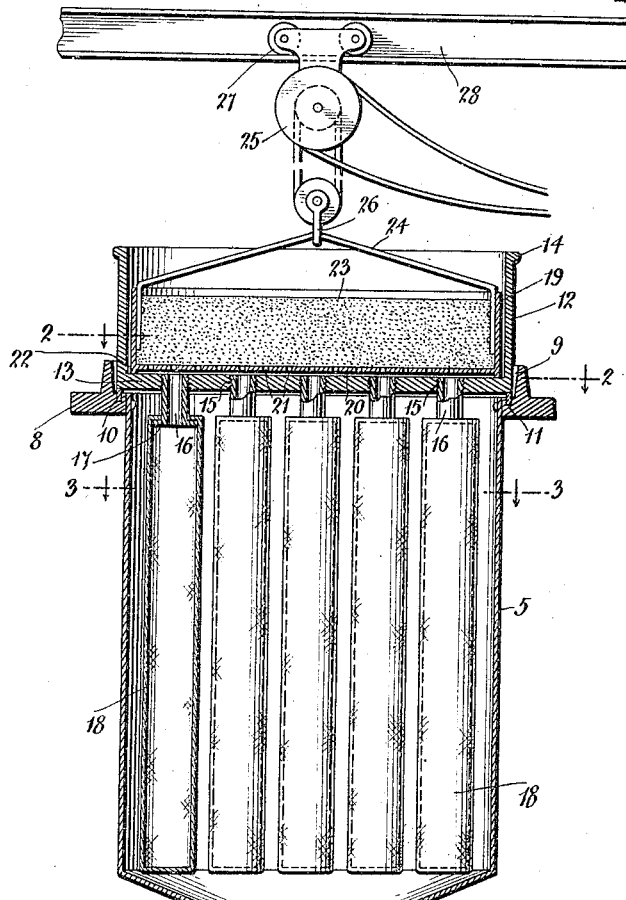
Fig. 1 is a transverse vertical section of the improved filter showing overhead trolley means for removing the filter basket and also adapted to withdraw the filtering receptacle or pot and bags from the main receptacle.
Figure 2:
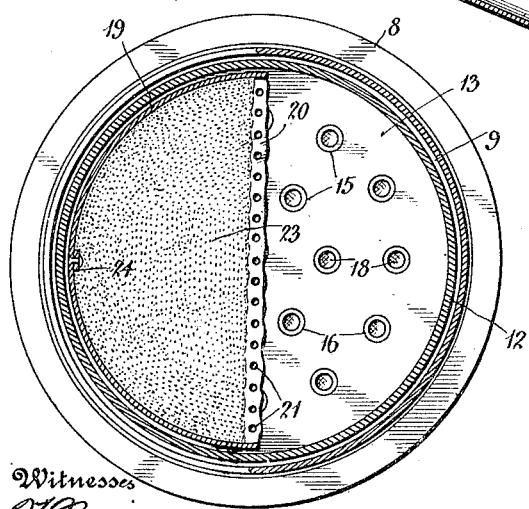
Fig. 2 is a horizontal section taken on the line 2—2, Fig. 1.
Figure 3:
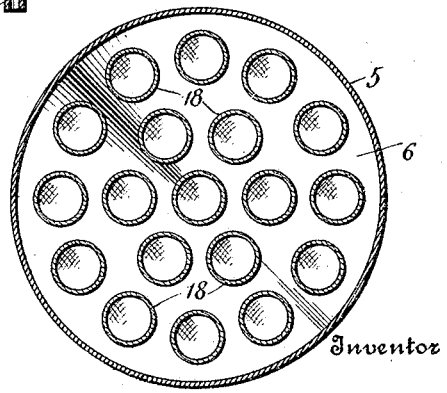
Fig. 3 is a horizontal section taken on the line 3—3, Fig. 1.

The improved bag filter comprises a main receptacle 5 having a lower hopper-shaped bottom 6 with a central outlet 7. Around the upper edge of the main filtering receptacle 5 is a metal flanged ring 8 preferably formed of cast-iron and having a seat or inner annular groove 9 formed therein and also provided with a bottom packing recess 10 to receive a packing 11. Within the seat or groove 9 a filtering pot 12 is mounted and has its bottom 13 in close engagement with the packing 11, the upper edge of the filtering pot 12 being preferably formed with an outwardly projecting flange 14. The bottom 13 of the pot 12 is formed with a plurality of screw-threaded openings 15 therethrough to receive bag nipples 16 having lower annular flanges 17. Secured on the flanges 12 are filtering bags 18 of suitable material, these bags depending from the nipples downwardly an equal distance into the receptacle 5 and preferably terminating slightly above the hopper-shaped bottom 6 of said receptacle. The nipples 16 set up communication between the filtering pot 12 and the bags 18 so that the liquid in the pot 12 may run downwardly into the filter bags 18.

Removably mounted in the filtering pot or receptacle 12 is a filter basket 19 constructed of any material adapted for the purpose and having a bottom 20 with perforations 21 therein. Surrounding the bottom 20 of the basket 19 and slightly depending below said bottom is a supporting flange 22 which is adapted to rest closely on the upper surface of the bottom 13 of the filtering pot 12 and encloses the upper open ends of the nipples 16, as clearly shown by Fig. 1. In other words, all of the upper ends of the nipples extending through the bottom 13 are within the flange 22, and by this means the liquid passing downwardly through the apertures or openings 21 in the bottom 20 of the basket 19 will be caused to continue downwardly through the nipples 16 into the bags 18. Within the basket 19 charcoal, kieselguhr or other filtering material is adapted to be placed as at 23, and the liquid to be filtered is poured into the pot and basket and passes or seeps downwardly through the filtering material. The basket 19 is also provided with a bail 24 for convenience in removing it from the pot 12. In practice there will be a number of the baskets 19 and, if desired, the receptacle 5 may also be equipped with a number of pots 12 having filter bags 18 carried thereby so as to facilitate the filtering operation by replacement of these filtering pots.

For conveniently lifting and conveying each basket 19 away from the pot 12 a hoist 25 is provided having a lower terminal hook or other analogous means 26 for engaging the bail 24. The hoist 25 is carried by a trolley 27 arranged to travel or move on a rail 28. When it is desired to lift the basket 19, the hoist is operated to clear the same from the pot 12 by causing the hook, grab or other device 26 to engage the bail 24. The basket may then be conveyed away from the pot 12 for cleaning or otherwise treating the same. In like manner the same hoist may be used to lift the pot 12 and the bags 18 from the receptacle or tank 5 for the purpose of removing or changing the filter bags 18.

From the foregoing the operation of the improved filter will be readily understood, as the only course pursued in treating liquid therewith is to deposit the cane sirup, for instance, in the pot 12 and basket 19 and causing such sirup to pass through the filtering material 23 and then downwardly through the nipples 16 into the filter bags 18. From the filter bags the material exudes into the hopper-shaped bottom 6 of the receptacle or tank 5 and is carried off through the outlet 7. It will be understood that the receptacle or tank will be supported by any suitable means and when the pot 12 is associated therewith, as shown by Fig. 1, the weight of said pot will be sufficient to maintain a tight joint between the packing 11 and the bottom 13 of the pot, and leakage of the liquid or cane sirup treated will be prevented. The same is also true of the basket 19, said basket having sufficient weight to cause the flange 22 to tightly bear on the upper surface of the bottom 13 and forming a tight joint which will prevent leakage, and, moreover, the said supporting flange provides a space between the bottom 20 of the basket and the upper surface of the bottom 13 of the pot 12 with material advantage in distributing the filtered liquid to the several nipples 16.

It is obvious that changes in the proportions or dimensions of the several parts may be adopted as found necessary and required to adapt the improved filter to various uses without in the least departing from the spirit of the invention.

What is claimed as new is:

1. In a filter of the class specified, the combination of a receptacle having a flange around the upper portion thereof with a seat therein, a filtering pot removably disposed in the seat of said flange and carrying a plurality of filtering bags which depend into the receptacle, the filtering bags having communication with the interior of the pot, and a filter basket removably mounted in the said pot and provided with a perforate bottom and filtering material therein.

2. In a filter of the class specified, the combination of a receptacle having a bottom outlet and an upper flange having a seat therein provided with packing, a filtering pot removably mounted in the seat of the flange and bearing upon said packing, the bottom of the pot having a plurality of nipples opening therethrough and supporting filtering bags which depend into the receptacle, and filtering means removably mounted in the said pot.

3. In a filter of the class specified, the combination of a receptacle having an outlet at the bottom thereof and a flange around the upper end provided with a seat, a filtering pot removably mounted in the seat of the flange and having a plurality of screw-threaded openings in the bottom thereof, a plurality of nipples engaging the said screw-threaded openings of the pot bottom and opening through the latter, the said nipples having flanges at their lower ends, filtering bags individually held on the flanges of the nipples and depending into the receptacle, and filtering means removably mounted in the pot.

4. In a filter of the class specified, the combination of a receptacle having an outlet at the bottom thereof and a flange surrounding the upper end and provided with a seat, a filtering pot removably mounted in the seat of the said flange and having a plurality of nipples opening through the bottom thereof, the nipples supporting filtering bags which depend into the receptacle, a filtering basket removably mounted in the pot and having a perforated bottom surrounded by a depending supporting flange to engage the upper surface of the pot bottom and form a space between the basket bottom and said pot bottom, and filtering material mounted in the said basket.

5. In a filter of the class specified, a receptacle having a bottom outlet and a flange surrounding the upper end thereof, said flange being provided with a seat, a filtering pot removably mounted in the seat of the flange and carrying a plurality of filtering bags having communication with the interior of the pot and depending into the receptacle, a filtering basket removably mounted in the pot and having filtering material therein and a perforated bottom and also provided with a bail, and hoisting and traveling means adapted to engage the bail of the basket and the filtering pot for removing the basket from the pot and also for removing the pot and basket from the receptacle.

In testimony whereof I have hereunto set my hand in presence of two subscribing witnesses.

ARTHUR D. STEVENS.

Witnesses:
ROBBIE E. BOONE,
N. A. GILBERT.